Oct. 31, 1967  E. F. EGAN  3,350,027
FLYING TRANSFER WINDER

Filed May 20, 1966  8 Sheets-Sheet 2

INVENTOR.
EDWARD F. EGAN
BY
*Harry S. Cook*
ATTORNEY

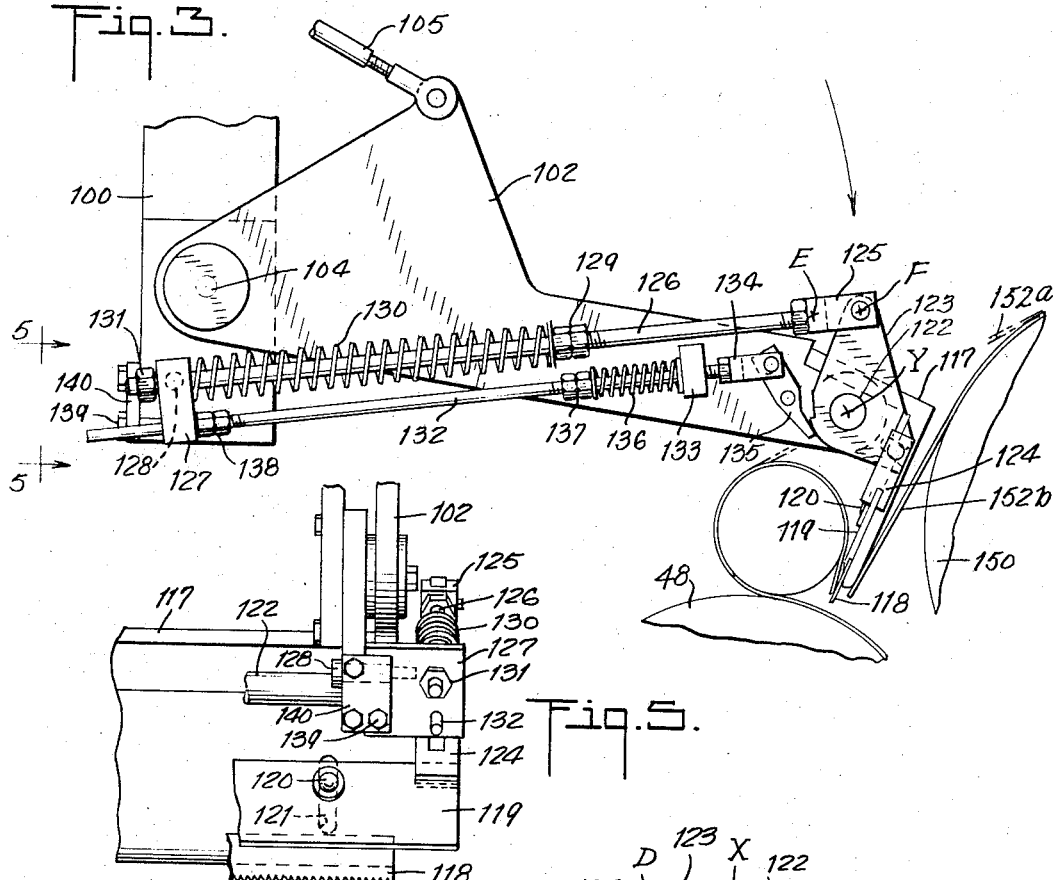

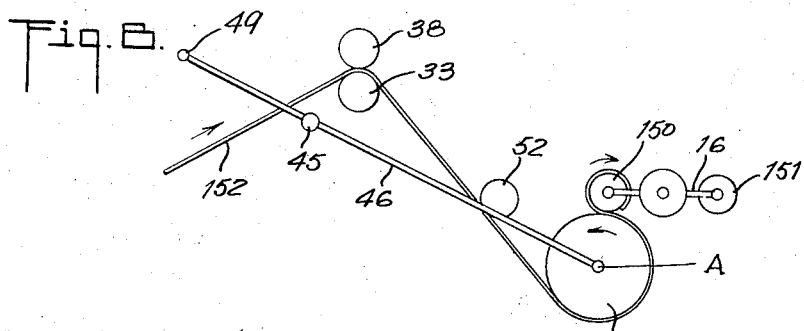
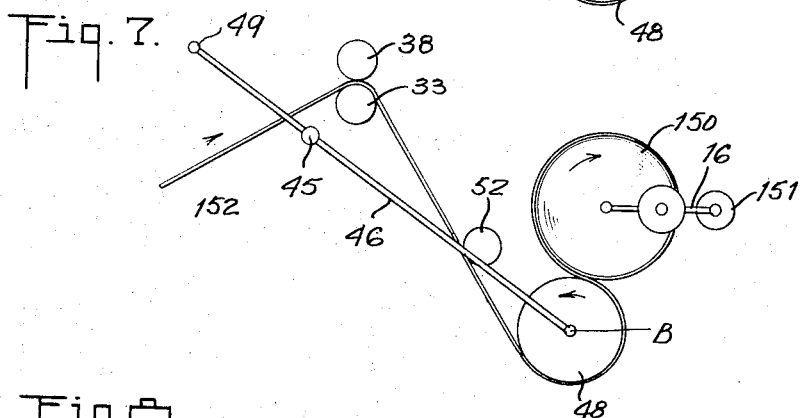
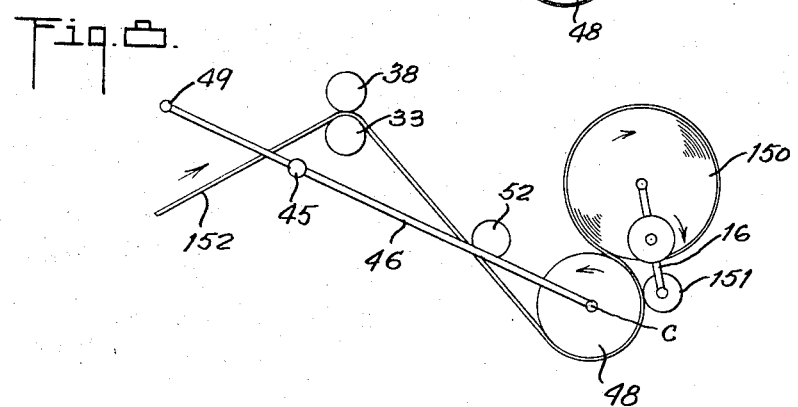
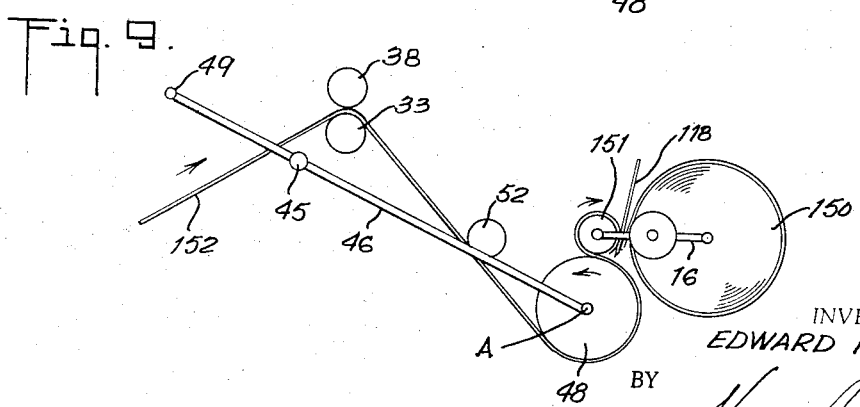

Oct. 31, 1967 E. F. EGAN 3,350,027
FLYING TRANSFER WINDER
Filed May 20, 1966 8 Sheets-Sheet 5

INVENTOR.
EDWARD F. EGAN
BY
Harry B. Cook,
ATTORNEY

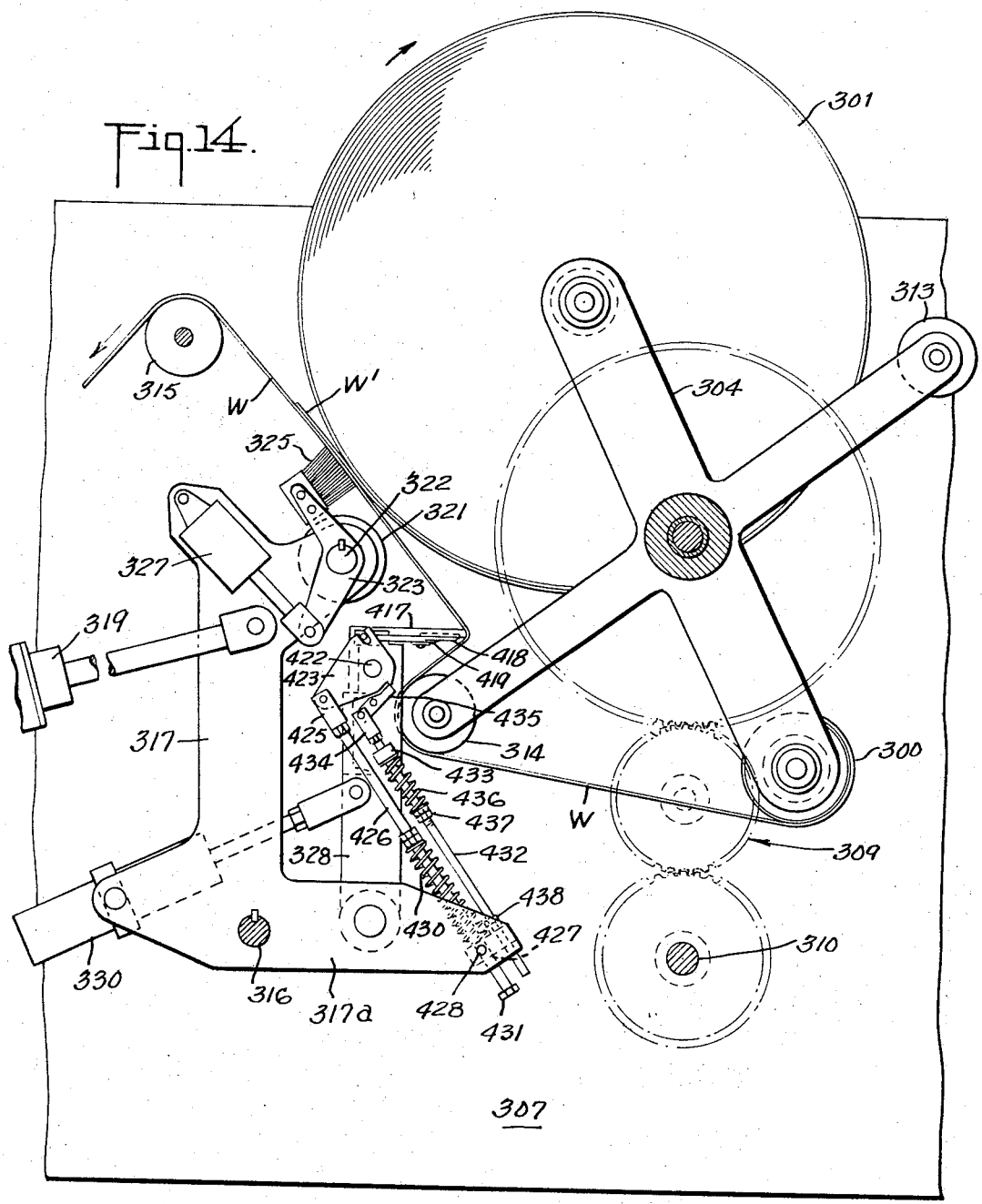

Oct. 31, 1967  E. F. EGAN  3,350,027
FLYING TRANSFER WINDER
Filed May 20, 1966  8 Sheets-Sheet 7

INVENTOR
EDWARD F. EGAN
BY
ATTORNEY

United States Patent Office 3,350,027
Patented Oct. 31, 1967

3,350,027
FLYING TRANSFER WINDER
Edward F. Egan, Martinsville, N.J., assignor to Frank W. Egan & Company, Somerville, N.J., a corporation of New Jersey
Filed May 20, 1966, Ser. No. 554,634
18 Claims. (Cl. 242—58.4)

This application is a continuation-in-part of my co-pending application Ser. No. 403,492 filed on Oct. 13, 1964.

This invention relates to winding machines and unwinding machines for webs of plastic, paper or other material wherein a web is severed between a roll and another roll or a core, and in particular the invention contemplates winders and unwinders of the continuous type which allow the moving web to be transferred from a fully wound roll to a new core without the necessity of stopping or slowing down the operation in the case of a winder, or which allow the moving web to be transferred from an expiring roll to a new roll also without the necessity of stopping or slowing down in the case of an unwinder. It is especially suited, but not limited, to the winding and unwinding of webs of thermoplastic films having the characteristics of softness or limpness and to the winding and unwinding of these plastics in webs of wide widths which heretofore have been difficult or impossible to wind in a continuous manner.

In many winding operations the end use of the product requires that the wound rolls be of comparatively small diameter. The cost of the cardboard cores on which the rolls are wound therefore becomes an appreciable part of the total cost of the wound roll of film, so that for the purpose of economy the cores used are small in diameter and light in wall thickness. Many of these cores may be less than two inches in diameter and with a wall thickness of less than 1/8 inch and it becomes obvious that a cardboard core of these dimensions on which a web ten or twelve feet wide is to be wound will barely support itself when chucked at each end, let alone have the rigidity to remain straight under the winding tensions and weight of the film. There is little to be gained by the use of a steel shaft as a manderl for the core since the shaft must be small enough in diameter to fit inside the core, which results in a shaft as small or smaller than 1 3/4 inches in diameter and a shaft of this size in a ten or twelve foot length will have considerable deflection due to its own weight. The use of a mandrel also requires extra labor to insert and remove the mandrel from the cores which adds to the cost of the finished roll, expecially when many small diameter rolls are being wound.

The conventional types of cut-off knives used on flying transfer winders do not work very well on soft or relatively thick plastic films since the knife, contacting the web, stretches the plastic and pushes the web ahead of the knife instead of severing the web.

I have, therefore, invented a novel and improved winder which will wind in a continuous manner, webs of plastic and paper and accomplish this winding in a manner that overcomes the disadvantages of conventional widers as stated above and with further advantages as will be set forth in the objects and description to follow:

It is, therefore, an object of the present invention to provide a winding machine which includes means to transfer the web being wound from a fully wound roll to a new core and accomplish the same at full line speed of the web.

It is a further object to provide the above when the web is a flexible thermoplastic of wide width.

Another object is to provide the above wherein means are including to slit the web into multiple strips and wind the strips side by side without interleaving with each other.

A further object is to provide a winder of the type as stated above wherein means are provided to support the new core to prevent deflection and bending of the core and subsequently, to support the roll being wound from the time it is started on the new core until it is almost fully wound.

Another object of the present invention is to provide a novel web severing means which will guide and sever the web adjacent to the nip of the new core and a support roll to start the web on the new core, and to accomplish this without the use of adhesive and with little or no fold back of the web on the new core.

In a flying splice unwinder it is necessary that the web unwinding from the nearly expired core be cut or severed immediately after the leading edge of the web from the new roll has been spliced to this web in order that the length of the doubled web be held to a minimum. In the subsequent processing of the web it is almost always necessary to discard this doubled web and it is, therefore, advantageous to have this as short as possible for economic reasons. Various types of cut-off devices are known and some work satisfactorily on certain types of webs, but heretofore none have been satisfactory for use on thin plastic webs, especially those that are stretchable such as polyethylene and vinyl films. It has been found that the novel web severing means of the present invention overcomes the shortcomings of the known types of cut-off knives and provides means for severing webs of the aforementioned types. In addition, it has been found that this cut-off knife works excellently on a great number of different types of webs including cellophane, various types of plastic, paper, paperboard and others.

It is, therefore, an additional object of the present invention to provide a novel web severing means which will guide and sever the web leading from an expiring roll on a flying splice unwinder.

The now preferred embodiment of the invention is illustrated in the accompanying drawings in which:

FIGURES 3 and 4 are enlarged side views of the web cutting and tucking means;

FIGURE 5 is an enlarged view of one end of the web cutting and tucking means;

FIGURES 6, 7, 8 and 9 are schematic side elevations showing the positions of the principle elements of the winder during the cycle of operations;

FIGURE 14 is a partial side elevation of a flying splice unwinder incorporating the web severing means of the present invention.

Figure 1:
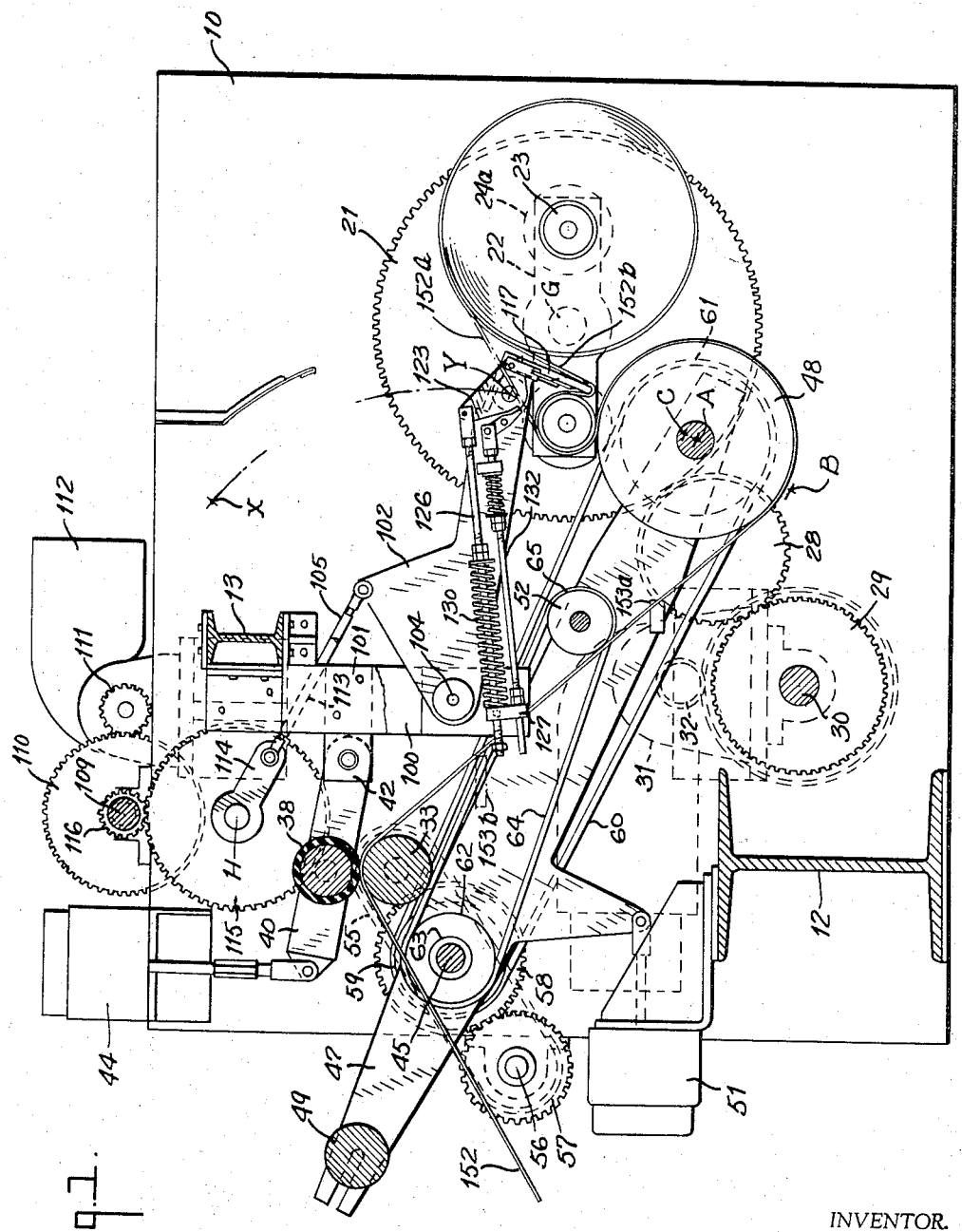
FIGURE 1 is a side elevation section of a continuous winder constructed according to the present invention.
Figure 2:
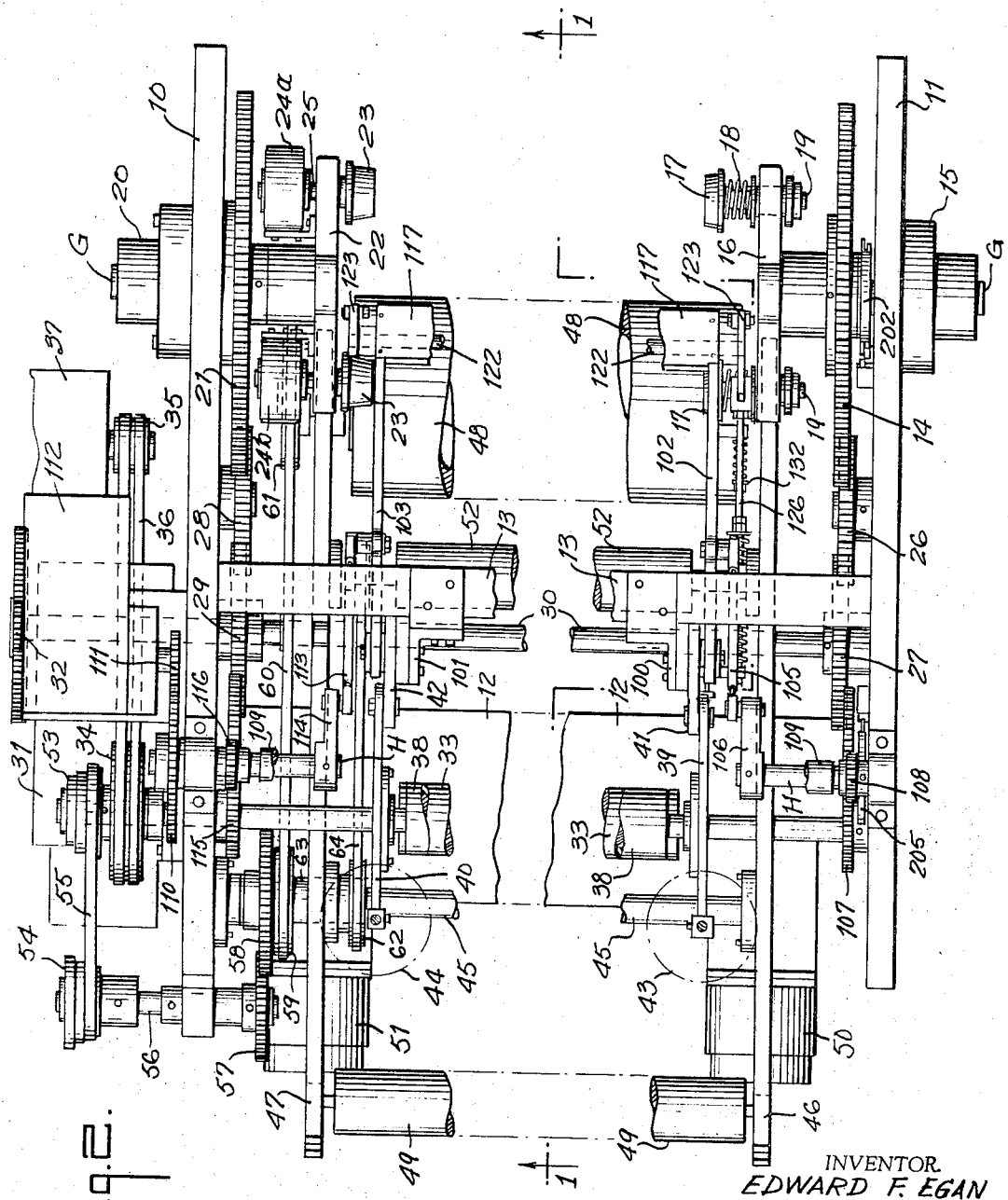
FIGURE 2 is a plan view of the same.
Figure 10:
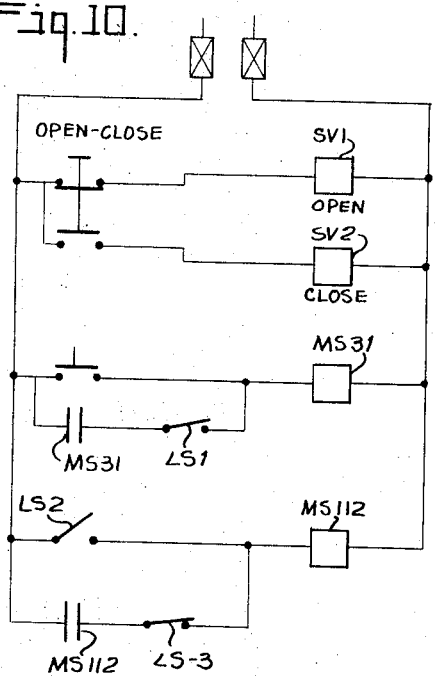
FIGURE 10 is a schematic view showing the electrical control circuit.
Figure 12:
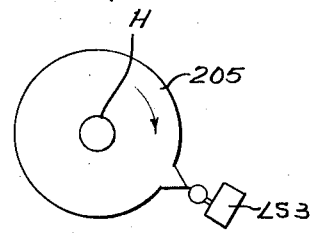
FIGURES 12 and 13 are schematic and fragmentary end elevation views of the cams for operating the limit switch.
Figure 13:
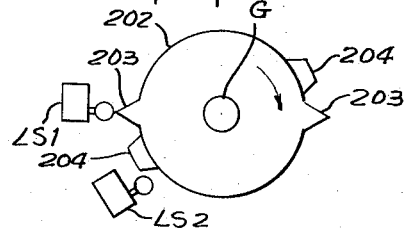
Figure 11:
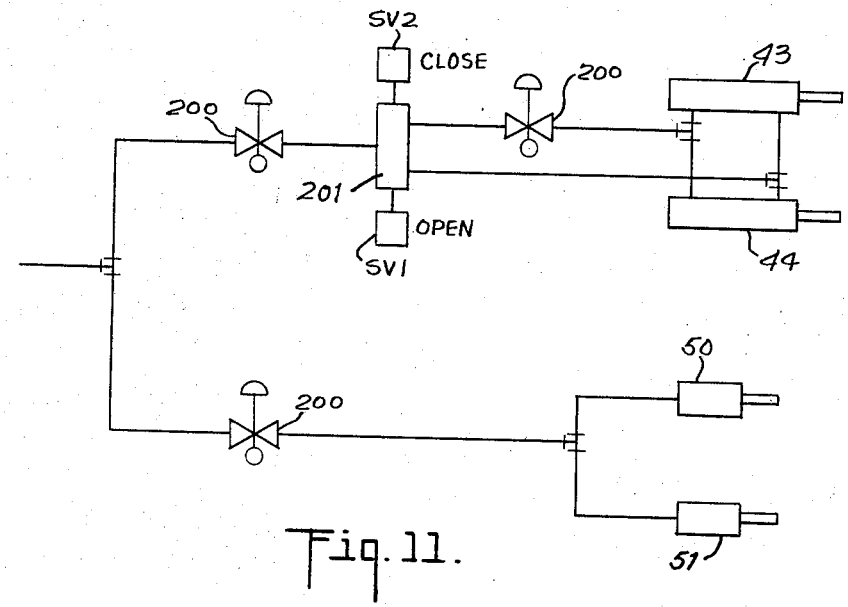
FIGURE 11 is a schematic view showing the pneumatic control circuit.

Referring to FIGURES 1 and 2, the winder consists of side frames 10 and 11 connected in spaced relationship by cross pieces 12 and 13. On frame 11 is rotatably mounted gear 14 in bearing 15 and fixed to gear 14 and rotating with it is arm 16 at each end of which is slidably mounted a core chuck 17, said chucks being urged toward the center of the machine by springs 18 and being freely rotatable on their shafts 19. In a like manner on the opposite side of the winder, arm 22 is fixed to gear 21 rotating in bearing 20 held to frame 10. Chucks 23 are fixed to shafts 25 which are coupled to winder drive motors 24a and 24b. Gears 14 and 21 are rotated by means of trains of gears 26, 27, 28 and 29 respectively and gears 27 and 29 are keyed on common cross shaft 30 which in turn is driven by pinion 32 on gear motor 31. By these means arms 16 and 22 are caused to rotate in synchronism. In operation, new cores are chucked between chucks 17 and 23, held in position by the force of springs 18, and rotated by motors 24a and 24b.

The part of the invention described above is generally known as a turret winder and as such may be constructed in various configurations differing in detail from the preferred embodiment shown here. For example, the spring 18 may be replaced by pneumatic or hydraulic cylinders, the motors may be located outside of the frames and drive to the chucks through a system of belts or chains, or the chucks themselves may be replaced by means to hold a core mandrel shaft between the arms when these are used. It should be noted, however, that in the preferred embodiment there is no center shaft through the rotational axis G of arms 16 and 22 between said arms.

Journaled in bearings in frames 10 and 11 is roll 33 which is driven through pulleys 34 and 35 and belts 36 by means of motor 37 which is controlled by known means to rotate roll 33 at the speed of the moving web. Other known means than motor 37 may be used to accomplish this; for example, a lineshaft which drives the processing machinery ahead of the winder may be extended to the winder and drive roll 33 by appropriate mechanical drives. Above roll 33 is resilient roll 38 journaled in bearings mounted on arms 39 and 40 which are pivotally attached to fixed brackets 41 and 42. Fluid cylinders 43 and 44 actuate arms 39 and 40 to raise roll 38 from contact with roll 33 in order to facilitate threading the web through the machine at start up. In the lower position roll 38 forms a nip with roll 33 in order to pull the web from the previous machine and then feed it into the wind up section.

Also journaled in bearings on frames 10 and 11 is rotatable cross shaft 45 on which are freely pivoted arms 46 and 47. Between these arms and rotatably journaled in bearings on the arms is large diameter lay-on roll 48, and at the opposite ends of the arms is bolted counterweight 49 which compensates for the weight of lay-on roll 48. Fluid cylinders 50 and 51 are connected to arms 46 and 47 respectively and act to rotate the arms about shaft 45 through arc BAC, these points representing different positions of the center of roll 48. Between shaft 45 and roll 48 and journaled in bearings on arms 46 and 47 is expander roll 52 which is preferably of the type known as a "Vari-Bow" as manufactured by the Mt. Hope Machinery Co. Lay-on roll 48 and expander roll 52 are both driven from the same source as the nip roll 33 through means that allow the speeds of the lay-on and expander rolls to be independently varied in relation to the nip roll 33. Keyed to roll 33 and adjacent to drive pulley 34 is cone pulley 53 which drives shaft 56 through belt 55 and cone pulley 54 mounted on shaft 56. This cone pulley drive provides a means of varying the speed of shaft 56 in relation to the speed of roll 33. However, it is possible to replace the cone pulley drive with one of many known variable speed devices to accomplish the desired results. Shaft 56 is journaled in frame 10 and at its inboard end is keyed gear 57 which meshes with gear 58 freely rotatably mounted on cross shaft 45. Attached to gear 58 and rotating with it is pulley 59 which drives lay-on roll 48 through belt 60 and pulley 61 keyed to roll 48. Also mounted on shaft 45 and rotating with gear 58 and pulley 59 through means of sleeve 63 is adjustable pitch pulley 62 which drives expander roll 52 through belt 64 and pulley 65 keyed to the expander roll. It can, therefore, be seen that a change in the speed setting of the cone pulley drive will result in a speed change of both the lay-on and expander rolls in relation to the nip roll while a change in the speed setting of the adjustable pulley 62 will result in a speed change of the expander roll in relation to the lay-on roll.

The cut-off knife assembly is shown by FIGURES 1 and 2 and also in enlarged views by FIGURES 3, 4 and 5. Support for this assembly is provided by brackets 100 and 101 which are fixed to cross piece 13. Knife arm 102 is pivotally mounted to bracket 100 on pivot pin 104 and is caused to rotate through an arc designated as XY by means of crank arm 105, crank 106, and gear train 107 and 108. Pinion 108 is keyed to cross shaft 109 which is rotated by means of gear 110 and pinion 111 which is mounted on motor 112. Knife arm 103 on the other side of the machine is pivotally mounted in a like manner to bracket 101 and is rotated in synchronism with arm 102 by crank arm 113, crank 114 and gear train 115 and 116, pinion 116 being keyed to cross shaft 109.

Fixed to the ends of the knife arms and extending across the machine between them is angle shaped knife holder 117 having two opposite sides one of which is approximately flat and meets the other in a sharply rounded narrow nose portion at the lower inside edge thereof adjacent which is retained serrated cutting blade 118 fixed to blade holder 119. Blade holder 119 is held to knife holder 117 by a plurality of shoulder screws 120 which hold the blade and blade holder against said one side of the knife holder and at the same time through the means of slots 121 in the blade holder permit the blade and blade holder to move along said side from a retracted position as shown in FIGURE 4 to a cutting position with the blade projected beyond the nose portion as shown in FIGURE 3. This movement of the blade and blade holder is accomplished by partial rotation of shaft 122 which is journaled in bearings in arms 102 and 103 and which extends outwardly beyond the arms at which points lever arms 123 are keyed. At one end of lever arms 123 and connecting with blade holder 119 are connecting links 124 which transmit the rotary motion of the lever arms to a straight line motion of the blade holder and blade.

Connected to the opposite end of lever arm 123 by means of clevis 125 is spring rod 126, the other end of which slides through a hole in pivot block 127 which is pivotally mounted by means of shoulder screw 128 to bracket 100. On rod 126 and between pivot block 127 and spring adjusting screws 129 is located compression spring 130 while on the opposite side of pivot block 127 is installed stop nut 131 on rod 126.

Through a second hole in block 127 and sliding through this hole is trigger rod 132 which also slides through a clearance hole in block 133 which is fixed to arm 102. At one end rod 132 is connected by means of clevis 134 to pawl 135 which in operation engages a notch in lever arm 123 and is held in engagement by action of compression spring 136 acting against adjusting nuts 137, and released from engagement by action of adjusting nuts 138 against block 127 as will be described later. Stop screw 139 in fixed bracket 140 acts to limit the movement of pivot block 127 as the knife assembly rotates clockwise.

The mechanism described above consisting of the spring rod, trigger rod and associated parts is necessary only on one side of the knife assembly since shaft 122 will transmit the resultant motions to the other side.

Operation of the cut-off knife is as follows: In the rest or retracted position as shown in FIGURE 4 arms 102 and 103 are in their uppermost position as indicated by X which designates as a reference the center of shaft 122. Blade 118 is in the retracted position and held there by the engagement of pawl 135 in the notch in lever arm 123. Pawl 135 is held in position by the force of compression spring 136 acting against nuts 137. For reference, the position of the pin connecting spring rod clevis 125 and lever arm 123 is denoted by D.

When a web cut and transfer are to be made, arms 102 and 103 are rotated in a clockwise direction by motor 112 through means previously described. As arm 102 rotates, spring rod 126 and trigger rod 132 move in the direction of pivot block 127 since the pivot axis of block 127 is below the pivot center of arm 102. Pivot block 127 is also caused to rotate in a clockwise direction by action of the spring and trigger rods until shortly before arm 102 reaches its lowest position, as denoted by Y, when the pivot block 127 contacts stop screw 139 and is stopped from further rotation. Shortly thereafter and immediately before arm 102 reaches its lowest position, adjusting nuts 138 on trigger rod 132 contact pivot block 127 and stop the movement of the trigger rod. Further movement of arm 102 then results in a clockwise rotation of pawl 135 until it disengages from the notch in lever arm at the time arm 102 reaches point Y. Lever arm 123 is then rotated clockwise at high speed by force of spring 130 so that the pivot pin of clevis 125 is moved from point E to point F and blade 118 is moved at high speed into the cut position, all as shown in FIGURE 3. Continued rotation of motor 112 results in a reversal of rotation of arms 102 and 103 until they return to their original position X. During this counter-clockwise rotation spring rod 126 moves in a direction away from pivot block 127 until stop nut 131 contacts pivot block 127. Further rotation of arm 102 then results in a counter-clockwise rotation of lever arm 123 until the pawl 135 again engages in the notch and the original position is attained at X ready for the next transfer.

Operation of the winder can best be understood by reference to FIGURES 6, 7, 8 and 9 in addition to FIGURES 1 and 3. FIGURE 6 represents the winding cycle at a time shortly after the web has started winding on a new core. Web 152 from a previous operation passes through the nip of rolls 33 and 38, then under expander roll 52, then under and partially around lay-on roll 48, through the nip of roll 48 and the new core, and is wound into a roll 150 on the new core which is driven by winder motor 24b. Lay-on roll 48 is pressed upwards against the winding roll 150 by fluid pressure in cylinders 50 and 51, supporting the core and roll throughout its length. As winding continues, roll 150 increases in diameter and forces lay-on roll downward against the pressure of the air cylinders until the situation is reached as shown in FIGURE 7 at which time the roll 150 is wound to slightly under the required final diameter and lay-on roll 48 is at or about position B. At this time winder motor 24a is turned on to drive new core 151 and the turret arms are slowly rotated in a clockwise direction. As the winding roll 150 moves upward due to this rotation, the lay-on roll moves upward with it and remains in contact with the winding roll until the position shown in FIGURE 8 is reached. At this point the previously chucked new core 151 moves into contact with the web on the lay-on roll. As the turret continues to rotate, the lay-on roll is forced downward again by the new core 151 until the turret has completed 180 degrees of rotation and the position shown in FIGURE 9 is attained. At this position the web now passes through the nip of the lay-on roll and the new core 151, wraps part way around the new core, and continues on to the winding roll 150, following web path 152a.

The cut-off knife assembly is then actuated as described previously to sever and transfer the web to the new core 151. As the knife holder 117 descends, the bottom nose portion which is rounded and polished smooth contacts the moving web and guides the web into the path shown as 152b wherein the web wraps the new core in excess of 270 degrees. At the lowest position of the knife holder the cutting blade is fired downward, cutting the web adjacent to the nip of the lay-on roll and the new core and guiding the free end of the web into this nip to start the web winding on the new core.

The knife assembly is then raised to its original position, the completed wound roll 150 removed from the winder, and a new core inserted in its place in preparation for the next cycle, the winder now being in the position shown in FIGURE 6.

The function of the expander roll 52 is to smooth and remove wrinkles from the web prior to winding. If it is desired to slit the web into multiple strips, slitters may be added as shown in FIGURE 1 as alternate positions 153a and 153b, these slitters being the razor blade type or any of the conventional type known in the industry. The preferred location of the slitters is determined in the main by the type of web being wound, in general location 153b being preferred for a relatively non-yielding type of web such as polypropylene while location 153a is preferred for a relatively yielding type of web such as polyethylene. In the former case the expander roll acts to slightly separate the slit webs from each other so as to prevent interleaving in the winding position while in the latter case the expander roll acts to impart a slight initial transverse strain in the web which results in a separation of the webs after they have been subsequently slit to accomplish the same result.

It can, therefore, be seen that this winder provides for support of the core and the winding roll through the means of the upward force of the lay-on roll 48 and this support is provided throughout the entire winding cycle with the exception of a very short time during the transfer when the fully wound roll is unsupported. The force or support supplied by the lay-on roll can easily be adjusted for varying conditions by adjusting the fluid pressure to the fluid cylinders 50 and 51.

The novel web severing means disclosed herein has several advantages over conventional cut-off means. In the present invention the web is brought into close proximity to the nip of the core and the lay-on roll before it is severed, and therefore the free end of the web after cutting has only a short distance to travel to enter the nip. In prior art means, the web is first cut and the free end then guided for a relatively long distance before entering the nip which makes it difficult to obtain a good start on the core without fold-back of the web.

As the knife holder 117 descents it rapidly changes the web path from that shown as 152a to 152b in FIGURE 3. Since web path 152b is considerably longer than path 152a, the web is placed under a momentary high tension as it travels around the nose portion of knife holder 117 and therefore is cut cleanly and easily when the blade is advanced beyond the nose portion at the sharp curve in the web with no tendency for the web to be stretched by the blade. It will be noted that the web is rigidly supported at the point at which the cut is made in contrast to prior art means where the web is unsupported for a considerable distance both before and after the knife.

It is necessary that the cutting blade travel with a high velocity to accomplish a good cut without ripping or shredding the web, especially at high web speeds. In known continuous winders the cutting blade itself must be of sufficient strength and rigidity to support itself and take the shock of cutting across the full width of the machine. In order to meet these requirements, the cutting blade, its supporting arms, and the actuating means that move with the blade must be of substantial construction and therefore, of substantial weight and inertia. This makes it difficult to impart a high velocity to the blade in the short distance it has to travel. In the present invention the cutting blade is supported along its full length by the knife holder in both the retracted and cutting positions and can therefore be of small cross section and light in weight. Since only the blade and several small levers are required to be moved for cutting, it is possible to impart a very high velocity to the blade with simple means.

The power required for winding the rolls is supplied by winding motors 24a and 24b which may be one of the several types of motors expressly designed and controlled for center winding and in addition the rolls are surface driven by contact with the driven lay-on roll 48. By means previously disclosed the speed of the lay-on roll may be varied to impart more or less driving force to the winding rolls and by this means the winding tension may be closely controlled.

The control of the operating sequences of the winder can be of conventional types comprising combinations of electrical and pneumatic or hydraulic components. A preferred control system is shown in FIGURES 10, 11, 12 and 13.

Raising and lowering of the nip roll 38 is controlled by the "open-close" pushbutton which energizes either solenoid SV1 or SV2 on solenoid operated air valve 201 which controls the air into nip roll cylinders 43 and 44. Air pressure regulating valves 200 control the air pressure to these cylinders. The air pressure in lay-on roll cylinders 50 and 51 is controlled by the third regulating valve 200.

To make a web transfer when the winding roll is nearly fully wound as in FIGURE 7, the turret rotation pushbutton is pressed, thus energizing motor starter MS–31, starting the turret rotation motor 31 and at the same time closing contact MS–31. Cam 202 is fixed to and rotates with turret rotating gear 14. After a few degrees rotation of the turret, cam projection 203 on cam 202 has rotated beyond limit switch LS1 and closes limit switch LS1. At this time the pushbutton may be released and the turret will continue to rotate since the circuit to MS–31 remains closed through contact MS–31 and limit switch LS1.

Shortly before the turret has rotated through 180 degrees the projection 204 on cam 202 closes limit switch LS2 and energizes motor starter MS–112, starting the cut-off knife motor and closing contact MS–112. Limit switch LS2 is then opened by further rotation of the turret but motor 112 continues to operate through holding circuit MS–112 and LS3. When the turret has rotated 180 degrees limit switch LS1 is opened by projection 203 which opens the circuit to starter MS–31 and stops the turret rotation.

The knife continues to descend until the cut and transfer is made at which time it reverses rotation due to crank arm 114 and returns to its original position at which place cam 205, which is fixed to and rotates with knife assembly rotation pinion 108, contacts limit switch LS3, opening the circuit to MS–112 and stopping motor 112, completing the cycle.

Figure 17:
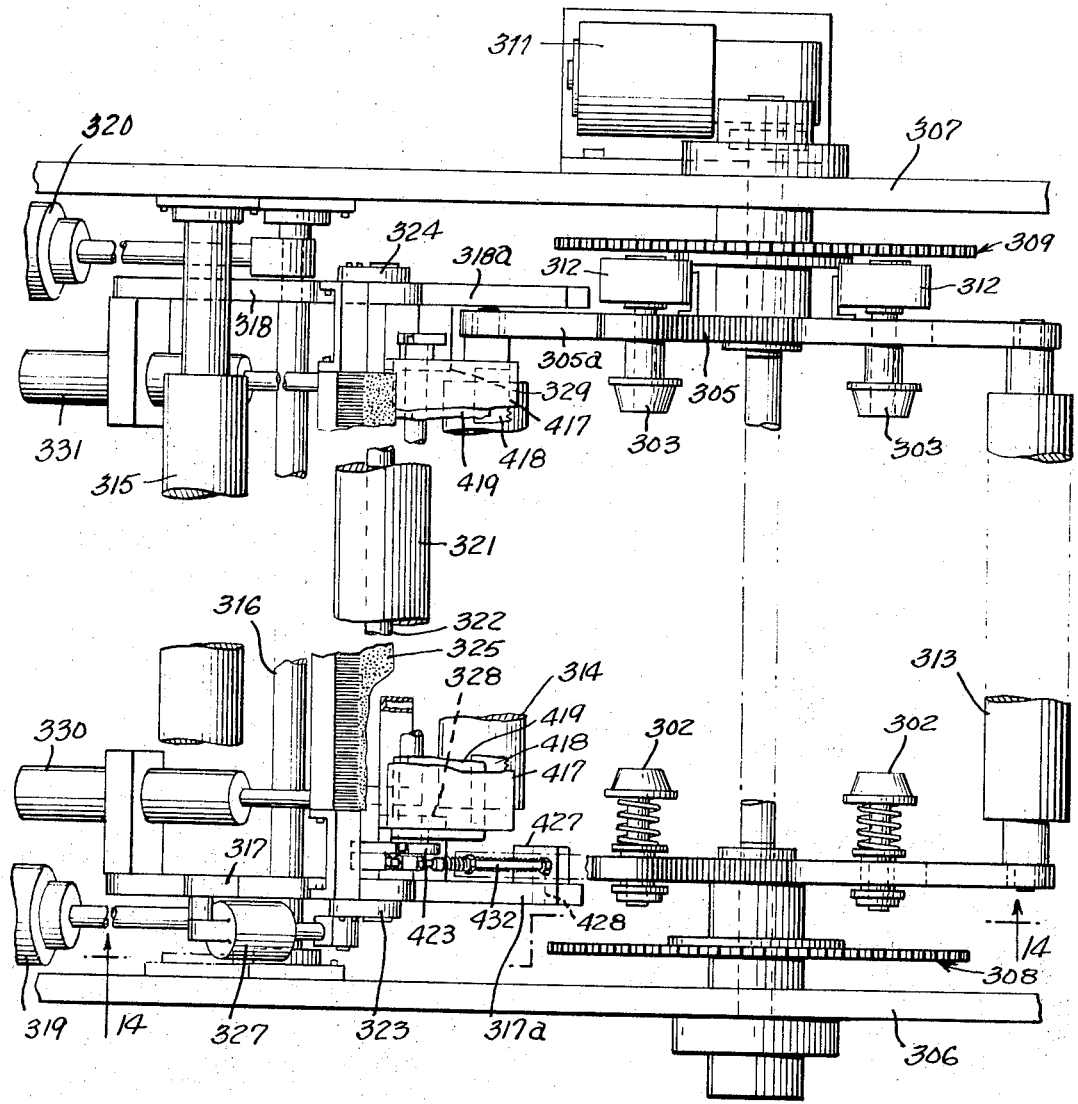
FIGURE 17 is a fragmentary plan of FIGURE 14, with the web omitted.

Referring to FIGURES 14 and 17, a turret type unwinder is shown which is similar in construction to the turret winder previously described. Expiring web roll 300 and new web roll 301 are held in position by chucks 302 and 303 mounted on turret arms 304 and 305. The turret arms are rotatably mounted on main side frames 306 and 307 and rotated in unison by means of gears 308 and 309 connected by gear trains to cross shaft 310 driven by motor 311. Suitable braking and driving devices 312 are furnished at each roll position to provide back tension on the web and to bring the new roll up to speed in preparation for splicing. Auxiliary turret arms 304a and 305a rotate together with turret arms 304 and 305 and have idler rolls 313 and 314 mounted in bearings at their extremities.

At the upper portion of the main side frames is journaled lead-out idler roll 315 while at the lower portion cross shaft 316 is rotatably mounted. Keyed to shaft 316 and spaced at each side of the unwinder are splice arms 317 and 318 which can be rotated toward and away from the turret by means of fluid cylinders 319 and 320. At the upper portion of the splice arms and extending between them is idler roll 321 mounted in bearings on shaft 322. Shaft 322 is rotatably mounted in bearings on arms 317 and 318 and has keyed to it at each end brush arms 323 and 324 between and carried by the upper ends of which is splicing brush 325 extending across the width of the machine. The brush can be moved toward or away from the new web roll by means of fluid cylinder 327 which has its head end pivoted on a pin fixed to splice arm 317.

At the lower extremity of splice arms 317 and 318 and extending in a direction toward the turret are arm extensions 317a and 318a upon which are pivoted knife arms 328 and 329 which can be partially rotated by fluid cylinders 330 and 331 pivoted on arms 317 and 318. Also mounted on splice arm extension 317a is pivot pin 428 supporting the pivot block 427 for the knife actuating assembly. The knife assembly is similar to that previously described for the winder but carries the reference characters 417 to 431 inclusive, instead of 117 to 131, respectively and will, therefore, not be described further.

Figure 15:
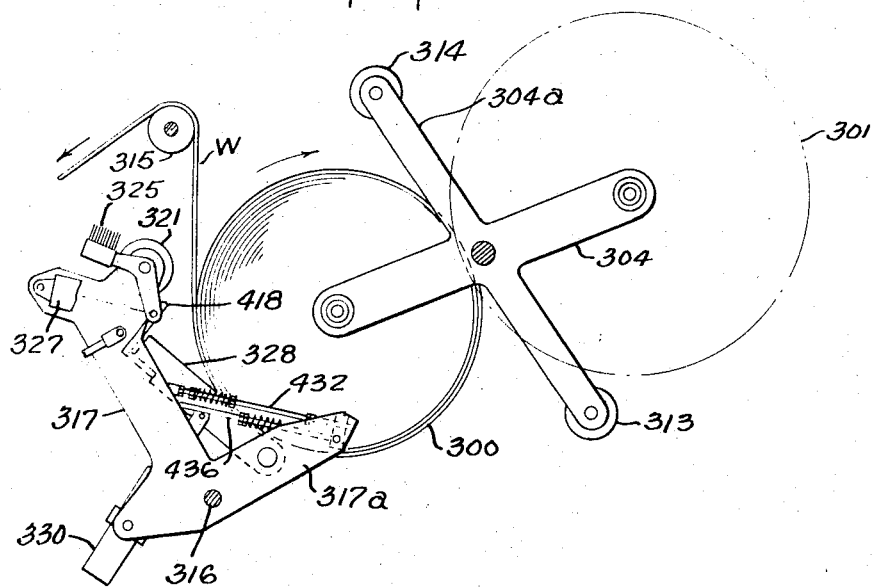
FIGURES 15 and 16 are schematic side elevations showing the positions of the principle elements of the unwinder during the cycle of operations.
Figure 16:
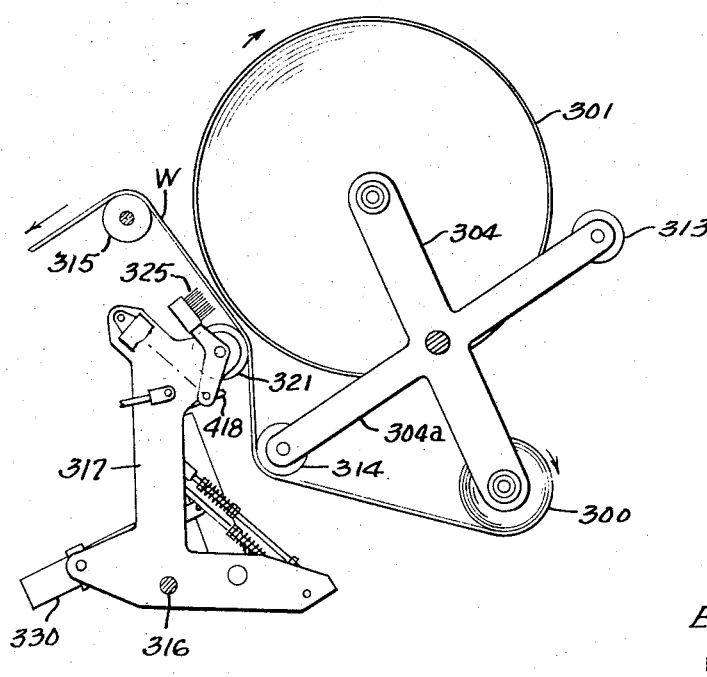

Operation of the unwind may best be understood by reference to FIGURES 14, 15 and 16 which show the principle components in three different positions of the splicing cycle. FIGURE 15 shows the unwinder in the normal unwinding position with the web W unwinding from web roll 300, passing upwards over lead-out idler 315 and thence to a processing machine. The splicing arms 317 and 318 are in their retracted position away from the unwinding web roll as are also the knife arms and the brush arms. At the opposite ends of the turret arms a completely expired web roll or core is ready to be removed from the unwinder.

After the expired roll has been removed from the turret arms and the unwinding web roll 300 has been sufficiently reduced in diameter, a new web roll 301 is chucked in position in the turret arms. This new web roll is then prepared with adhesive in the conventional manner for splicing. The turret arms are then rotated counterclockwise until they reach the position as shown in FIGURE 16. The splice arms are then advanced toward the new web roll 301 to the position also shown in FIGURE 16 where the idler roll 321 is within a short distance of the new roll. The web now leaves the web roll 300, passes over idler rolls 314 and 321, and passes in close proximity to the new web roll between idlers 321 and 315.

When it is desired to make a splice from the expiring web roll to the new web roll, the new web roll 301 is accelerated by conventional means up to a rotational speed corresponding to the existing web speed. As best shown in FIGURE 14, the brush is then advanced, forcing the running web against the new roll where it splices to the leading end $W^1$ of the web on the new roll. Immediately after the splice is made the knife arms are advanced and move the knife toward the running web between idler roll 314 and the new web roll 301, causing contact of the nose of the knife holder with the web and forcing the web into a new path as shown in FIGURE 14. At its furthest advance position the knife holder 417 places the web under tension between the idler roll 314 and the new unwinding web roll 301, and the knife is fired by means previously described and severs the web. The splice arms, knife arms and brush are then retracted to their original positions and the turret arms rotated until they reach the position shown in FIGURE 15 in preparation for the next cycle.

It will be noted that at the instant of cutting, the web path has been increased in length resulting in a momentary increase in web tension as the web travels around the nose of the knife holder 417 and, therefore, the web is cut cleanly and easily when the blade is advanced, and only a short piece of the web is left between the point of severance and the splice.

Control of the operating sequences of the unwinder can be of conventional types well known in the art and comprising combinations of electrical and pneumatic or hydraulic components. It is preferred that the operation be made as automatic as possible, especially for high web speeds and that the timing be set so that the web is severed at the shortest time practical after the splice is made to insure a minimum of doubled web.

It should be understood that other control means than those above described can be used to accomplish the objectives set forth. For example, in the case of the winder a counter may be used to count the length of web being wound on the roll and used to initiate the transfer cycle when the required length is reached.

I claim:

1. A machine for winding a traveling web into rolls, comprising the combination of a frame, a lay-on roll around which a web passes, rotary core-supporting means on said frame for holding circumferentially spaced cores and moving them in succession into contact with and away from said lay-on roll, means for rotating each core during part of its cycle of movement to wind the web into a roll thereon, means mounting said lay-on roll for movement relatively to the cores and for maintaining the lay-on roll in contact with the winding roll and providing for yielding movement of the lay-on roll by the winding roll during the winding operation to support the winding roll, the first-mentioned means and the second-mentioned means providing for movement of a new core between the winding roll and the lay-on roll and into contact with the portion of the web between said lay-on roll and the winding roll while said winding roll is in contact with said lay-on roll in preparation for starting winding of the web on the new core.

2. A machine as defined in claim 1 with the addition of means for severing said portion of the web between the new core and the winding roll.

3. A machine as defined in claim 1 with the addition of means for tucking said portion of the web partially around the new core to start winding of the web on the new core and means for severing said portion of the web.

4. A machine as defined in claim 3 wherein the last two-named means include a knife holder pivotally mounted on said frame and having a nose portion to tuck the web, and a blade mounted on and supported throughout its length by said knife holder adjacent said nose portion and means for swinging said knife holder to move said nose portion and said blade into contact with and away from said portion of the web in timed relation to the movement of said cores.

5. A machine as defined in claim 4 wherein said blade is movably mounted on said knife holder, and with the addition of means for moving the blade with a snap action into and out of contact with the portion of the web between said winding roll and the new core while said portion of the web is taut and partially wound on the new core.

6. A machine as defined in claim 1 with the addition of means for tucking said portion of the web partially around the new core to start winding of the web as the new core and means for severing said portion of the web, and wherein the last two-named means include a knife holder pivotally mounted on said frame and having a nose portion to tuck the web, and a blade movably mounted on and supported throughout its length by said knife holder adjacent to said nose portion and means for swinging said knife holder to move said nose portion and said blade into contact with and away from said portion of the web in timed relation to the movement of said cores and wherein the mounting of said knife holder on the frame includes two spaced parallel arms coaxially pivotally mounted on the frame, and means mounting the knife holder on and between said arms, and with the addition of means connected between said frame and said blade for actuating the latter with a snap action to translate the rotary motion of said knife holder by said parallel arms into a straight line motion of said blade.

7. A machine as defined in claim 6 wherein said blade is reciprocably mounted on said knife holder, and the last-named means includes lever arms pivoted on said parallel arms, spring means normally urging said lever arms in the direction to actuate the blade into cutting position and a trigger mechanism normally holding said lever arms against movement by said spring means, and means on said frame coacting with said trigger mechanism to release said lever arms when said blade holder is moved by the knife arms to a predetermined position.

8. A machine as defined in claim 1, wherein the means mounting said lay-on roll and maintaining it in contact with the winding roll includes a pair of spaced arms coaxially pivotally mounted intermediate their ends in said frame on and between which said lay-on roll is at one side of the pivotal mounting journaled for rotation, a counterweight for said lay-on roll at the opposite side of said pivotal mounting and fluid pressure piston and cylinder devices connected between said arms and said frame.

9. A machine as defined in claim 2 with the addition of means controlling movement of said rotary core-supporting means to hold the winding core stationary in contact with the lay-on roll during the severing of the web.

10. For use in a web winding machine wherein a web is wound partially around a core supported in a frame, a tucking knife for tucking and severing a portion of the web between said core and a wound roll, comprising a knife holder adapted to be pivotally mounted on said frame and having a nose portion to tuck the web, and a blade mounted on and supported throughout its length by said knife holder adjacent to said nose portion and means for swinging said knife holder to move said nose portion and said blade into contact with and away from said portion of the web, the pivotal mounting of said knife holder on the frame including two spaced parallel arms adapted to be coaxially pivotally mounted on the frame, and means mounting the knife holder on and between said arms, and with the addition of means connected between said frame and said blade for actuating the latter with a snap action to translate the rotary motion of said knife holder by said parallel arms into a straight line motion of said blade.

11. For use in a web winding machine wherein a web is wound partially around a roll mounted in a frame, a tucking knife for tucking and severing a portion of the web between two rolls comprising a knife holder adapted to be pivotally mounted on said frame and having a nose portion to tuck the web, and a blade mounted on and supported throughout its length by said knife holder adjacent to said nose portion and means for swinging said knife holder to move said nose portion and said blade into contact with and away from said portion of the web, the pivotal mounting of said knife holder on the frame including two spaced parallel arms adapted to be coaxially pivotally mounted on the frame, and means mounting the knife holder on and between said arms, and with the addition of means connected between said frame and said blade for actuating the latter with a snap action to translate the rotary motion of said knife holder by said parallel arms into a straight line motion of said blade.

12. An improvement in a machine wherein a traveling continuous web has a portion thereof running in a straight path from one roll to another roll on a frame, said improvement comprising a knife for severing said portion of the web at a point between said rolls, said knife comprising a knife holder adapted to be movably mounted on said frame and having a nose portion to contact and press said portion of the web under tension out of said straight path, and a blade mounted on and supported throughout its length by said knife holder adjacent to said nose portion, and means for swinging said knife holder to move said nose portion and said blade into contact with and away from said portion of the web, the mounting of said knife holder on the frame including two spaced parallel arms adapted to be coaxially pivotally mounted on the frame, and means mounting the knife holder on and between said arms, and with the addition of means connected between said frame and said blade for actuating the latter with a snap action to translate the rotary motion of said knife holder by said parallel arms into a straight line motion of said blade.

13. The improvement as defined in claim 12, wherein the last-named means comprise lever arms pivotally mounted on said parallel arms, spring means normally urging the lever arms in the direction to actuate the blade into cutting position, and a trigger mechanism normally holding said lever arms against movement by said spring means, and means adapted to be mounted on said frame coacting with said trigger mechanism to release said lever arms when said blade holder is moved by the knife arms to a predetermined position.

14. The combination of a frame, means including two rolls mounted thereon for longitudinally moving a continuous web with a portion thereof extending in a straight path between said rolls, a knife for severing said portion of the web at a point between said rolls, said knife comprising a knife holder having a nose portion to contact and press said portion of the web under tension out of said path, a blade mounted on and supported throughout its length by said knife holder adjacent to said nose portion and means for swinging said knife holder to move said nose portion and said blade into contact with and away from said portion of the web, the pivotal mounting of said knife holder on the frame including two spaced parallel arms coaxially pivotally mounted on the frame, and means mounting the knife holder on and between said arms, and with the addition of means connected between said frame and said blade for actuating the latter with a snap action to translate the rotary motion of said knife holder by said parallel arms into a straight line motion of said blade.

15. The combination as defined in claim 14, the last-named means comprising lever arms, spring means normally urging them in the direction to actuate the blade into cutting position, and a trigger mechanism normally holding said lever arms against movement by said spring means, and means adapted to be mounted on said frame coacting with said trigger mechanism to release said lever arms when said blade holder is moved by the knife arms to a predetermined position.

16. An improvement in a machine wherein a traveling continuous web has a portion thereof running in a straight path from one roll to another roll revolubly mounted with their axes parallel on a frame, said improvement comprising a knife for severing said portion of the web at a point between said rolls, said knife comprising a knife holder movably mounted on said frame and having two opposite sides one of which is approximately flat and meets the other in a sharply rounded narrow nose portion to contact said portion of the web, a knife blade mounted on and movable along said one side of said holder adjacent said nose portion and normally disposed inwardly of said nose portion, means for actuating said knife holder to move said nose alternately in opposite directions to contact said portion of the web and press it under tension out of said straight path and to move said knife holder away from said portion of the web, respectively, and means for moving the blade with a snap action beyond said nose and into contact with said portion of the web to sever it while said web portion is pressed under tension by the nose of said knife holder.

17. For use in a web winding machine wherein a web is wound partially around a core supported in a frame, a tucking knife for tucking and severing a portion of the web between said core and a wound roll, comprising a knife holder adapted to be movably mounted on said frame and having two opposite sides one of which is approximately flat and meets the other in a sharply rounded narrow nose portion, a knife blade mounted on and movable along said one side of said knife holder adjacent said nose portion and normally disposed inwardly of said nose portion, means for actuating said knife holder alternately in opposite directions to move said nose first to contact said portion of the web and press it under tension partially around the core to tuck the web and then to move said knife holder away from said portion of the web, respectively, means including springs for moving the blade with a snap action beyond said nose portion and into contact with said portion of the web to sever said portion of the web while it is so pressed under tension and while it is being tucked, and releasable trigger means for normally holding said blade against movement by the springs.

18. For use in a web winding machine wherein a web is wound partially around a core supported in a frame, a tucking knife for tucking and severing a portion of the web between said core and a wound roll, comprising a knife holder adapted to be pivotally mounted on said frame and having two opposite sides one of which is approximately flat and meets the other in a sharply rounded narrow nose portion, a knife blade mounted on and movable along said one side of said knife holder adjacent said nose portion and normally disposed inwardly of said nose portion, means for actuating said knife holder alternately in opposite directions to move said nose first to contact said portion of the web and press it under tension partially around the core to tuck the web and then to move said knife holder away from said portion of the web, respectively, and means for moving the blade with a snap action beyond said nose portion and into contact with said portion of the web to sever said portion of the web while it is so pressed under tension and while it is being tucked.

References Cited
UNITED STATES PATENTS

| | | | |
|---|---|---|---|
| 1,489,167 | 4/1927 | Spiess | 242—56 X |
| 2,009,707 | 7/1935 | Scott | 242—58.2 |
| 2,686,015 | 8/1954 | Stevens | 242—56 |
| 2,779,546 | 1/1957 | Scott | 242—58.3 |
| 3,257,085 | 6/1966 | Riegger | 242—58.3 |

LEONARD D. CHRISTIAN, *Primary Examiner.*